(12) United States Patent
Balber et al.

(10) Patent No.: US 12,481,794 B2
(45) Date of Patent: *Nov. 25, 2025

(54) ANALYZING SCRIPTS TO CREATE AND ENFORCE SECURITY POLICIES IN DYNAMIC DEVELOPMENT PIPELINES

(71) Applicant: CyberArk Software Ltd., Petach-Tikva (IL)

(72) Inventors: Michael Balber, Be'erot Yitzhak (IL); Eli Shemesh, Or Yehuda (IL)

(73) Assignee: CyberArk Software Ltd., Petach-Tikva (IL)

( * ) Notice: Subject to any disclaimer, the term of this patent is extended or adjusted under 35 U.S.C. 154(b) by 328 days.

This patent is subject to a terminal disclaimer.

(21) Appl. No.: 18/185,276

(22) Filed: Mar. 16, 2023

(65) Prior Publication Data

US 2023/0367911 A1    Nov. 16, 2023

Related U.S. Application Data

(63) Continuation-in-part of application No. 17/741,533, filed on May 11, 2022, now Pat. No. 11,609,985.

(51) Int. Cl.
*G06F 21/00*    (2013.01)
*G06F 8/41*    (2018.01)
*G06F 21/64*    (2013.01)

(52) U.S. Cl.
CPC .............. *G06F 21/64* (2013.01); *G06F 8/427* (2013.01)

(58) Field of Classification Search
CPC .................................. G06F 8/427; G06F 21/64
USPC .............................................................. 726/1
See application file for complete search history.

(56) References Cited

U.S. PATENT DOCUMENTS

| | | | |
|---|---|---|---|
| 10,261,782 B2 | 4/2019 | Suarez | |
| 11,093,377 B2 | 8/2021 | Burrell | |
| 11,144,438 B1 | 10/2021 | Teixeira | |
| 11,265,292 B1 | 3/2022 | Leviseur | |
| 11,495,347 B2 * | 11/2022 | De Armas | G16H 10/60 |

(Continued)

FOREIGN PATENT DOCUMENTS

WO    WO-2020252088 A1    12/2020

OTHER PUBLICATIONS

Alex Ilgayev, How We Discovered Vulnerabilities in CI/CD Pipelines of Popular Open-Source Projects, Mar. 18, 2022, (Mar. 18, 2022), pp. 1-17, XP093084578, Retrieved from the Internet: URL:https://cycode.com/blog/github-actions-vulnerabilities/ [retrieved on Sep. 21, 2023].

*Primary Examiner* — Josnel Jeudy
(74) *Attorney, Agent, or Firm* — Finnegan, Henderson, Farabow, Garrett & Dunner LLP

(57) ABSTRACT

Disclosed embodiments relate to systems and methods for enforcing security policies in dynamic development pipelines. Techniques include accessing a build script, including a set of instructions for a software build process, parsing the build script to identify a set of scripted build instructions, determining a set of expected build actions based on the scripted build instructions, and constructing a representation of the set of expected build actions. The techniques may further include automatically generating a tiered security policy based on the representation of the set of expected build actions, monitoring a dynamic pipeline running the build script, and enforcing the security policy for the dynamic pipeline environment.

20 Claims, 8 Drawing Sheets

(56) References Cited

U.S. PATENT DOCUMENTS

| | | |
|---|---|---|
| 11,947,946 B1 * | 4/2024 | Rao ....................... G06N 20/20 |
| 2016/0253625 A1 | 9/2016 | Casey |
| 2017/0116412 A1 | 4/2017 | Stopel |
| 2018/0121659 A1 | 5/2018 | Sawhney |
| 2018/0300480 A1 | 10/2018 | Sawhney |
| 2018/0321918 A1 | 11/2018 | Mcclory |
| 2019/0180036 A1 | 6/2019 | Shukla |
| 2020/0082094 A1 | 3/2020 | Mcallister |
| 2020/0082095 A1 | 3/2020 | Mcallister |
| 2020/0097357 A1 | 3/2020 | Shwartz |
| 2020/0097662 A1 | 3/2020 | Hufsmith |
| 2020/0202006 A1 | 6/2020 | Shah |
| 2021/0026969 A1 | 1/2021 | Hod |
| 2021/0157623 A1 | 5/2021 | Chandrashekar |
| 2021/0382813 A1 | 12/2021 | Moondhra |
| 2022/0091830 A1 | 3/2022 | Ionescu |
| 2022/0138004 A1 | 5/2022 | Nandakumar |
| 2022/0215101 A1 | 7/2022 | Rioux |
| 2023/0376603 A1 * | 11/2023 | Yaron ....................... G06F 8/71 |

\* cited by examiner

ANALYZING SCRIPTS TO CREATE AND ENFORCE SECURITY POLICIES IN DYNAMIC DEVELOPMENT PIPELINES

CROSS-REFERENCE TO RELATED APPLICATIONS

This application is a continuation-in-part of, and claims the benefits of priority to, U.S. application Ser. No. 17/741,533, filed May 11, 2022, the entirety of which is hereby incorporated by reference.

BACKGROUND

In software engineering, modern development operations practices often employ a continuous integration or continuous delivery/deployment pipeline (CI/CD), which combines continuous code integration, delivery, and deployment into four major phases: source, build, test, and deploy. Also known as a dynamic development pipeline, a CI/CD pipeline strengthens and expedites integration between development and operation activities by employing automation in building, testing, and deploying applications. CI/CD services compile incremental code changes made by developers, and then link and package them into software deliverables. Automated tests verify the software's functionality and automated deployment services deliver the software or software-based services to end users. The aim is to increase early defect discovery, increase productivity, and provide faster release cycles. Each phase in the CI/CD pipeline uses highly detailed processes, standards, tools, and automation. Just as physical products made in a factory may benefit from customized manufacturing machines, software pipelines are frequently tailored to suit the specific needs of the project and the enterprise.

The first phase in a CI/CD pipeline is the creation of source code, where developers translate requirements into functional algorithms, behaviors, and features. The tools employed for this depend on whether the development team is working in Java, NET, C#, PHP, or countless other development languages. Integrated development environments ("IDEs") are often selected because they support a specific language in addition to various code-checking features, such as basic error detection, vulnerability scanning, and adherence to established coding standards. Other source code and pipeline support tools, including code repositories and version control systems, such as Git™, typically form the foundation for building and testing phases.

The second phase in a CI/CD pipeline is the build process. The build process draws source code from a repository, establishes links to relevant libraries, modules any dependencies, and compiles (builds) all these components into an executable (e.g., .exe) file. Tools used in this stage also generate logs of the process, denote errors to investigate and correct, and notify developers that the build is complete.

As with source code creation, build tools typically depend on the selected programming language. A development group may employ independent tools to generate a build. Many IDEs incorporate such build capabilities, which means they effectively support both the source creation and building phases within a CI/CD pipeline. A build phase may employ additional tooling, such as scripts, to translate the executable file into a packaged or deployable execution environment, such as a virtual machine (complete with an operating system and related components) or a container, such as Docker™ container, with libraries and dependencies.

Problems may arise when CI/CD pipelines lack adequate security measures. Malicious actors may exploit vulnerabilities in source code and may, for example, access a build server and insert a backdoor. The continuous updates employed in the CI/CD pipeline may spread this single attack at the source code and build levels throughout the software supply chain, granting a threat actor access to systems and data on networks and computers throughout the distribution supply chain. Therefore, the CI/CD pipeline poses unique security risks because malicious actors may target the development level of the pipeline and subsequently compromise many victims throughout the supply chain.

Solutions are needed to secure CI/CD pipelines from malicious attack. Such solutions should include techniques for continuously monitoring and enforcing security policies in dynamic development pipelines. Such solutions should include parsing build scripts and identifying a set of scripted build instructions. Expected build actions should be identified and a representation of the expected build actions should be constructed. Technological solutions should advantageously improve operational security by generating a security policy based on the representation of the set of expected build actions. For example, the representation of the set of expected build actions may identify specific command executions, dependencies, or certain input and output instructions. A security policy may be generated that grants permissions to allow certain actions to be performed and blocks other actions outside of the expected build actions, such as those inserted by a malicious actor. Technological solutions should also involve monitoring a build machine running the build script and enforcement of a security policy on the build machine, such as notifying a user of an attack, blocking an action, or allowing an action or other security actions.

Additional technical problems may arise when monitoring and enforcement of security policies are limited to the build machine. Malicious actors may seek to compromise the security of code at multiple points in a dynamic development pipeline. For example, malicious actors may attack repositories and libraries before or after sourcing, before or after the build phase, before or after testing or quality control, and before or after code is packaged for deployment. Thus additional technological solutions are needed to expand monitoring and enforcement of security policies in dynamic development pipelines beyond the build phase and the build machine.

Such solutions should include techniques for monitoring the entire dynamic development pipeline environment, or various points therein, and enforcing the security policy for the dynamic development pipeline environment. Such solutions may include monitoring the dynamic development pipeline using software components preinstalled on various elements of the dynamic development pipeline environment. Such monitoring solutions should also include collecting automated messages, command, and API calls from various components in the dynamic development pipeline. Solutions should also implement monitoring and enforcement at multiple events in time within the build process. For example, monitoring and enforcement should be performed in connection with (before or after) one or more of sourcing code, a build phase, and package deployment. Additional techniques are described below, which provide technical solutions to the above problems.

SUMMARY

The disclosed embodiments describe non-transitory computer readable media, systems, and methods for enforcing security policies in dynamic development pipelines. For example, in an embodiment, a non-transitory computer readable medium may include instructions that, when executed by at least one processor, cause the at least one processor to perform operations for enforcing security policies in dynamic development pipelines. The operations may comprise accessing, from a database, a build script including a set of instructions for a software build process, parsing the build script to identify a set of scripted build instructions, determining a set of expected build actions based on the scripted build instructions, constructing a representation of the set of expected build actions, and automatically generating a security policy based on the representation of the set of expected build actions.

According to a disclosed embodiment, the operations may further comprise monitoring a build machine running the build script and enforcing the security policy on the build machine.

According to a disclosed embodiment, generating the security policy may further comprise generating a tiered security policy based on the representation of the set of expected build actions.

According to a disclosed embodiment, the operations may further comprise determining a set of expected sub-actions based on the build actions. In some embodiments, a representation of the expected build actions and sub-actions may be constructed. In a disclosed embodiment, the tiered security policy may be based on the representation of the set of expected build actions and sub-actions.

According to a disclosed embodiment, the operations may further comprise performing a security action comprising at least one of generating an alert, generating a report, blocking an action, allowing an action, prompting a user for administrative approval, or revoking permissions.

According to a disclosed embodiment, constructing the representation of the set of expected build actions may include identifying specific command executions contained in the set of scripted build instructions.

According to a disclosed embodiment, constructing the representation of the set of expected build actions may include identifying specific network resources to perform the scripted build instructions.

According to a disclosed embodiment, constructing the representation of the set of expected build actions may include identifying dependencies based on the set of scripted build instructions.

According to a disclosed embodiment, constructing the representation of the set of expected build actions may include identifying input and output instructions based on the set of scripted build instructions.

According to a disclosed embodiment, the set of scripted build instructions may include accessing an external file, and the set of expected build actions may further include connecting to a repository containing the external file.

According to a disclosed embodiment, automatically generating the security policy may include allowing a connection to the repository containing an external file.

According to a disclosed embodiment, the set of scripted build instructions may include identifying a module used to download and install third-party packages, and the set of expected build actions may include connecting to an external source and may further include identifying a set of folders or files expected to be created at runtime.

According to a disclosed embodiment, automatically generating the security policy may include granting permission to connect to a resource from which third-party packages will be downloaded and may further include granting permission to generate folders or files associated with the third-party packages.

According to a disclosed embodiment, the set of scripted build instructions may include building, tagging, and pushing an image to a container registry, and the set of expected build actions may further include connecting to the container registry and may further include generating a set of system call commands.

According to a disclosed embodiment, automatically generating the security policy may include granting permission to connect to the container registry and may further include granting permission to execute the set of system call commands.

According to another disclosed embodiment, there may be a computer-implemented method for enforcing security policies in dynamic development pipelines. The method may comprise accessing, from a database, a build script including a set of instructions for a software build process, parsing the build script to identify a set of scripted build instructions, determining a set of expected build actions based on the scripted build instructions, constructing a representation of the set of expected build actions, and automatically generating a security policy based on the representation of the set of expected build actions.

According to a disclosed embodiment, the method may further comprise monitoring a build machine running the build script and enforcing the security policy on the build machine.

According to a disclosed embodiment, the method may further comprise monitoring one or more build machines running the build script, storing data associated with the execution of the build script in a database, and identifying malicious activity associated with one or more build actions associated with the build script.

According to a disclosed embodiment, identifying malicious activity associated with one or more build actions may include implementing a machine-learning algorithm configured to identify failures in the execution of the build script.

According to a disclosed embodiment, failures may include the security policy denying access, by the build machine, to a dependent third-party resource.

According to a disclosed embodiment, the set of expected scripted build instructions may include at least one of: accessing an external file, identifying a module used to download and install third-party packages, or building, tagging, and pushing an image to a container registry; and the set of expected build actions may include connecting to a repository containing the external file, connecting to an external source and identifying a set of folders and files expected to be created at runtime, or connecting to the container registry and generating a set of system call commands.

According to a disclosed embodiment, automatically generating the security policy may include at least one of: allowing a connection to the repository containing the external file, granting permission to connect to the third-party packages, granting permission to generate folders and files associated with the third-party package, granting permission to connect to the container registry, or granting permission to execute the set of system call commands.

The disclosed embodiments may also include non-transitory computer readable media, systems, and methods for enforcing security policies in dynamic development pipelines. For example, in an embodiment, a non-transitory computer readable medium may include instructions that, when executed by at least one processor, cause the at least one processor to perform operations for enforcing security policies in dynamic development pipelines. The operations may comprise accessing a build script including a set of instructions for a software build process, parsing the build script to identify a set of scripted build instructions, determining a set of expected build actions based on the set of scripted build instructions, constructing a representation of the set of expected build actions, automatically generating a tiered security policy based on the representation of the set of expected build actions, monitoring a dynamic development pipeline environment running the build script, and enforcing the security policy for the dynamic development pipeline environment.

According to a disclosed embodiment, the dynamic development pipeline environment may comprise at least one of a user device, a source code manager, a build machine, a package manager, an artifact manager, an internal pipeline security provider; or a production environment.

According to a disclosed embodiment, monitoring the dynamic development pipeline environment may further include the use of additional software components preinstalled on the dynamic development pipeline environment. In some embodiments, at least one of the additional software components is a ptrace tracing tool. In other embodiments, at least one of the additional software components may be an extended Berkeley Packet Filter (eBPF) tracing tool.

According to a disclosed embodiment, monitoring the dynamic development pipeline environment may further include collecting automated messages, commands, and API calls. In some embodiments, the automated messages may include HTTP messages sent to a predefined URL.

According to a disclosed embodiment, collecting automated messages, commands and API calls may include collecting Command Line Interface (CLI) commands.

According to a disclosed embodiment, monitoring the dynamic development pipeline environment may include collecting information associated with one or more build events.

According to a disclosed embodiment, monitoring the dynamic development pipeline environment may include tracking network traffic between a build machine and a source code manager or a repository.

According to a disclosed embodiment, enforcing the security policy may include terminating a build process running on a build machine. In another embodiment, enforcing the security policy may include blocking deployment of source code from a repository to a build machine. In yet another embodiment, enforcing the security policy may include blocking deployment of an artifact to the production environment. In another embodiment, enforcing the security policy may include interfering with at least one event within the dynamic development pipeline environment.

According to a disclosed embodiment, the operations may further comprise determining a set of expected sub-actions based on the build actions, the representation may includes the set of expected build actions and sub-actions, and the tiered security policy may be based on the representation of the set of expected build actions and sub-actions.

In an embodiment, constructing the representation of the set of expected build actions may include identifying specific command executions contained in the set of scripted build instructions. In another embodiment, the set of scripted build instructions may include accessing an external file and the set of expected build actions include connecting to a repository containing the external file.

According to a disclosed embodiment, the set of scripted build instructions may include building, tagging, and pushing an image to a container registry, the set of expected build actions includes connecting to the container registry, and the operations may further comprise generating a set of system call commands.

According to a disclosed embodiment, the tiered security policy may be based on dependencies between expected build actions.

According to a disclosed embodiment, there may be a computer-implemented method for enforcing security policies in dynamic development pipelines. The method may comprise accessing a build script including a set of instructions for a software build process, parsing the build script to identify a set of scripted build instructions, determining a set of expected build actions based on the set of scripted build instructions, constructing a representation of the set of expected build actions, automatically generating a tiered security policy based on the representation of the set of expected build actions, monitoring a dynamic development pipeline environment running the build script, and enforcing the security policy for the dynamic development pipeline environment.

According to a disclosed embodiment, monitoring the dynamic development pipeline environment may include collecting information associated with one or more build events using software components preinstalled on the dynamic development pipeline environment and may further include receiving automated HTTP messages sent to a predefined URL.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
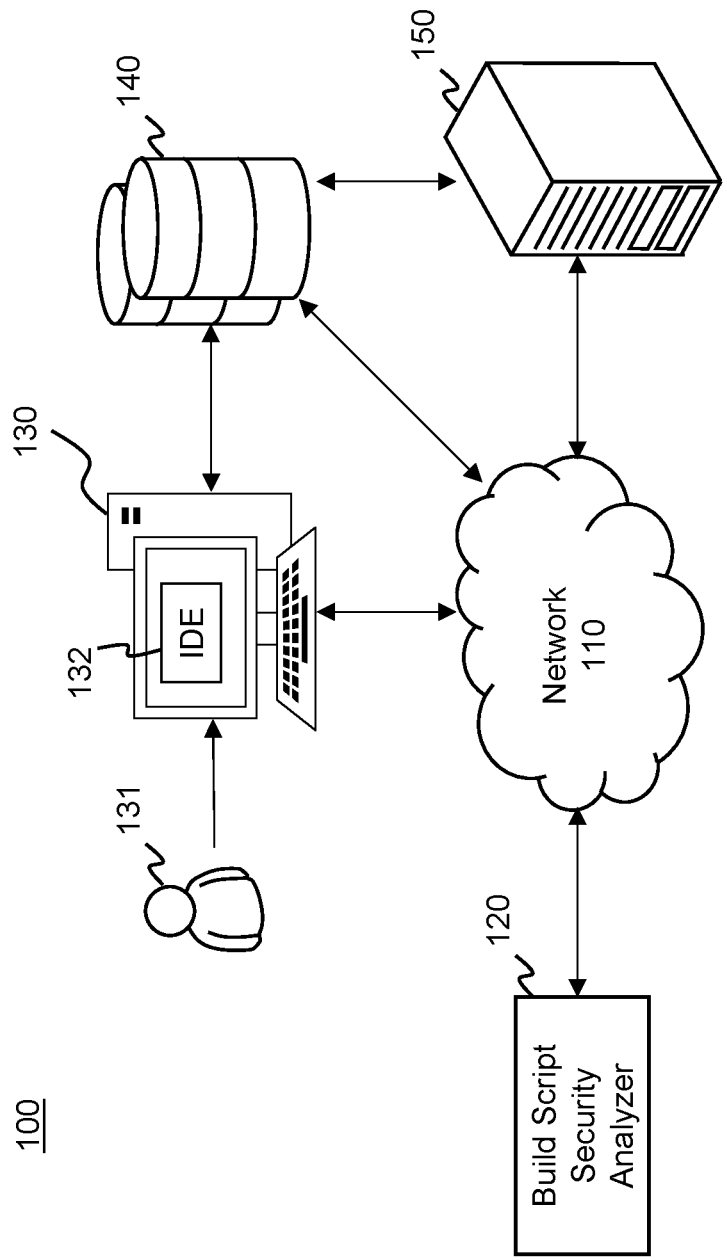
FIG. 1 is a block diagram of an exemplary system for enforcing security policies in dynamic development pipelines in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for analyzing build scripts described herein overcome several technological problems relating to security, efficiency, and functionality in the fields of cybersecurity and software management. In particular, the disclosed embodiments provide techniques for enforcing security policies in dynamic development pipelines. As discussed above, malicious actors may target the development level of the CI/CD pipeline and may spread security vulnerabilities to a host of unsuspecting targets through the CI/CD delivery process. Existing techniques fail to provide continuous monitoring and enforcement of security policies in dynamic development pipelines, in particular on build machines or during the build process.

The disclosed embodiments provide technical solutions to these and other problems arising from current techniques. For example, disclosed techniques create efficiencies over current techniques by examining build scripts to identify a set of expected build actions. Constructing a representation of the set of expected build actions identified from a build script may reveal a hierarchy or other arrangement of build actions. A security policy may be generated based on the representation that permits a system to perform certain expected build actions. The security policy improves security because it may create permission settings based on, for example, build actions expected to be performed based on information contained in the script file. Solutions may further consider certain dependencies among the build actions and may grant or deny permission settings based on a sequence of expected actions or a comprehensive set of expected associated activities. Security policies may be narrowly tailored to the expected set of build actions and may prevent access to resources specified from malicious actors or prevent the creation of file structures needed to execute malicious code. Disclosed techniques for enforcing security policies in dynamic development pipelines may further be combined with security monitoring and enforcement programs. For these, and other reasons that will be apparent to those skilled in the art, the disclosed techniques provide improved security, performance, and efficiency over existing techniques.

Machine learning algorithms may be employed for the purposes of enforcing security policies in dynamic development pipelines, monitoring multiple build machines running the build script, identifying failures in the execution of the build scripts, and generating or updating the security policies. Such algorithms may be trained using training examples or training data sets. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, techniques that train machine learning algorithms may further use validation examples and/or test examples. For example, validation examples and/or test examples may include example inputs together with the desired outputs corresponding to the example inputs. A trained machine learning algorithm and/or an intermediately trained machine learning algorithm may be used to estimate outputs for the example inputs of the validation examples and/or test examples. The estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper-parameters, where the hyper-parameters may be set manually by a person or automatically by a process external to the machine learning algorithm (such as a hyper-parameter search algorithm), and the parameters of the machine learning algorithm may be set by the machine learning algorithm according to the training examples. In some implementations, the hyper-parameters may be set according to the training examples and the validation examples, and the parameters may be set according to the training examples and the selected hyper-parameters.

Further, the disclosed techniques may be automated using a trained machine learning algorithm. Such automation improves efficiency by eliminating or reducing the need for user input and increases accuracy and speed of code review beyond the capabilities of a human. Furthermore, while many current secret detection techniques are limited to alerting a user of the existence of a hidden secret, the disclosed techniques may provide solutions to remediating the hidden secret, thus quickly and efficiently eliminating a security risk to an organization without further review or manual action by a user.

Reference will now be made in detail to the disclosed embodiments, examples of which are illustrated in the accompanying drawings.

FIG. 1 illustrates an exemplary system 100 for enforcing security policies in dynamic development pipelines, consistent with the disclosed embodiments. System 100 may represent an environment in which software code is developed and/or executed, for example in a cloud environment. System 100 may include one or more build script security analyzers 120, one or more computing devices 130, one or more databases 140, and one or more servers 150, as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an integrated development environment (IDE) 132 operated on computing device 130. Examples may include FileMaker™, Essential Studio™, Visual LANSA™, GeneXus™, and various others.

System 100 may further comprise one or more database(s) 140, for storing and/or executing software. For example, database 140 may be configured to store software or code, such as code or build scripts developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of slave databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure or services of Amazon Web Services™ (AWS), Microsoft Azure™ Google Cloud Platform™, Cisco Metapod™, Joyent™, vmWare™, or other cloud computing providers. Data sharing platform 140 may include other commercial file sharing services, such as Dropbox™, Google Docs™, or iCloud™, etc. In some embodiments, data sharing platform 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in enforcing security policies in dynamic development pipelines as discussed below in FIGS. 4-5.

Build script security analyzer 120 may be any device, component, program, script, or the like, for enforcing security policies in dynamic development pipelines within system 100, as described in more detail below. Build script security analyzer 120 may be configured to monitor other components within system 100, including computing device 130, integrated development environment 132, database 140, and server 150. In some embodiments, build script security analyzer 120 may be implemented as a separate component within system 100, capable of analyzing software and computer codes or scripts within network 110. In other embodiments, build script security analyzer 120 may be a program or script and may be executed by another component of system 100 (e.g., integrated into computing device 130, database 140, or server 150).

Figure 2:
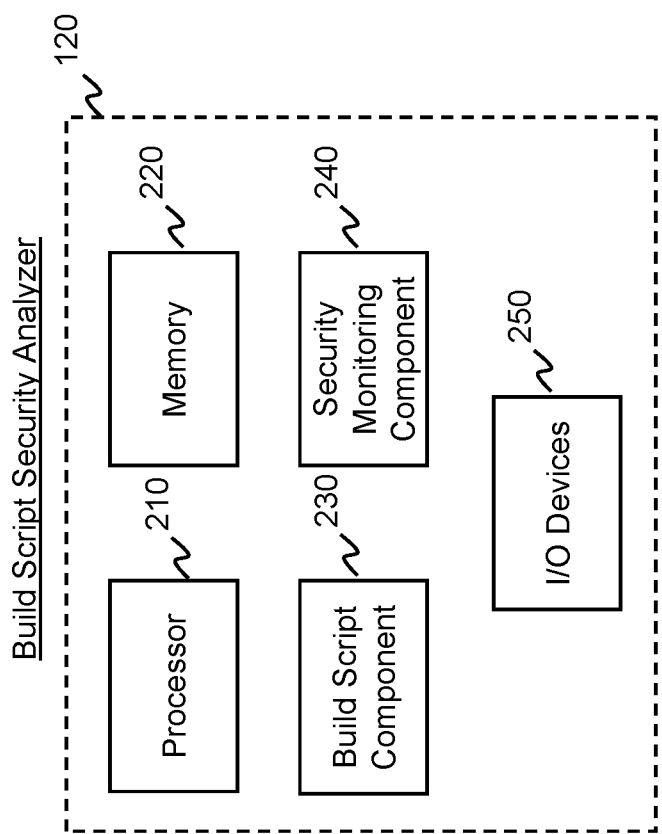
FIG. 2 is a block diagram showing an exemplary build script security analyzer in accordance with disclosed embodiments.

Build script security analyzer 120 may comprise additional elements to facilitate analysis of software, code, functions, and/or scripts within system 100. FIG. 2 is a block diagram showing an exemplary build script security analyzer 120 in accordance with disclosed embodiments. For example, build script security analyzer 120 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMOR, Qualcomm®, Apple®, NVIDIA®, or the like. The processor 210 may also be based on the ARM architecture, a mobile processor, or a graphics processing unit, etc. In some embodiments, build script security analyzer 120 may be employed as a cloud service, such as a Software as a Service (SaaS) system, a Platform as a Service (PaaS), or Infrastructure as a Service (IaaS) system. For example, hidden secret detector 120 may be based on infrastructure of services of Amazon Web Services™ (AWS), Microsoft Azure™, Google Cloud Platform™ Cisco Metapod™, Joyent™, vmWare™, or other cloud computing providers. The disclosed embodiments are not limited to any type of processor configured in the computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to enforce security policies in dynamic development pipelines from computing device 130, for example, using methods 400 and 500, described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Build script security analyzer 120 may further comprise one or more components for performing various operations of the disclosed embodiments. For example, build script security analyzer 120 may contain a build script component 230 and a security monitoring component 240. Build script component 230 may be configured to access or receive code, code segments, or build scripts from other components or devices within system 100. For example, build script component 230 may be configured to access and inspect computing device 130, database 140, or server 150 for the presence of build scripts and to parse the build scripts to identify a set of scripted build instructions as discussed below. Build script component 230 may further be configured to determine a set of excepted build actions based on the scripted build instructions, construct a representation of the set of expected build actions, and automatically generate a security policy based on the representation of the set of expected build actions. Security monitoring component 240 may be configured to monitor a build machine, such as computing device 130, running the build script and enforce the security policy generated by build script component 230, such as by generating an alert, generating a report, blocking an action, allowing an action, prompting a user for administrative approval, or revoking permissions, among other actions.

Build script component 230 and security monitoring component 240 may be separate components of build script security analyzer 120, for example, with dedicated processors and/or memories. In other embodiments, though shown separately in FIG. 2, build script component 230 and security monitoring component 240 may be integrated into memory 220 and/or processor 210. For example, build script component 230 and/or security monitoring component 240 may be software code, a script, or an application stored on memory 220 and/or executed by processor 210. Further, while build script security analyzer 120 is shown as having dedicated processor 210 and memory 220, build script security analyzer 120 itself may be integrated into various other components in system 100. For example, processor 210 and/or memory 220 may be the processor and memory devices of another component in system 100, for example on server 150, database 140, or computing device 130. In such embodiments, build script security analyzer 120 may be executed as software code, a script, or an application.

Build script security analyzer 120 may further include one or more input/output (I/O) devices 250. I/O devices 250 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, build script security analyzer 120 may use a network adaptor to scan for code and code segments within system 100. In some embodiments, the I/O devices 250 may also comprise a touchscreen configured to allow a user to interact with hidden secret detector 120 and/or an associated computing device. The I/O devices 250 may comprise a keyboard, mouse, trackball, touch pad, stylus, and the like. Like processor 210 and memory 220, in embodiments where hidden secret detector 120 is executed as software or code, I/O devices 250 may be associated with another component of system 100.

Figure 3:
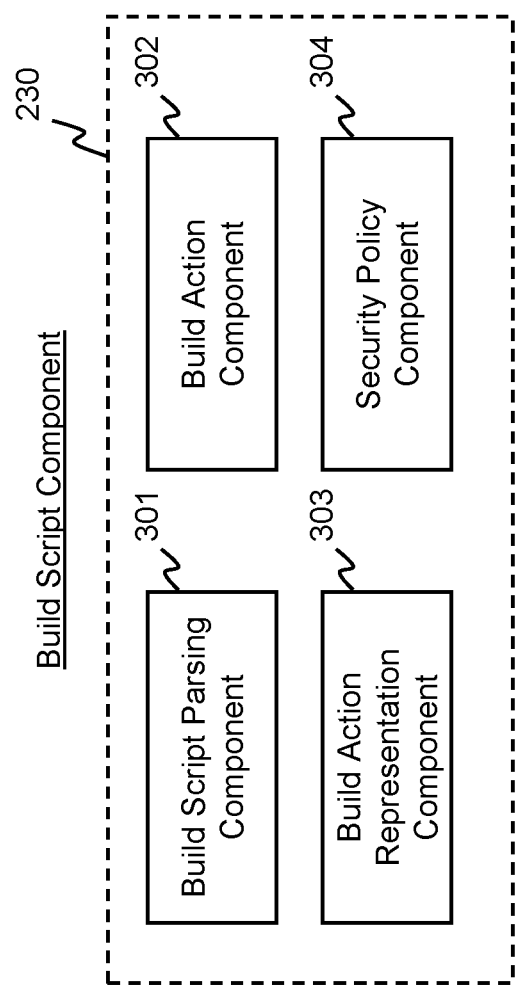
FIG. 3 is a block diagram showing an exemplary build script component in accordance with disclosed embodiments.

FIG. 3 is a block diagram showing an exemplary build script component 230 in accordance with disclosed embodiments. Build script component 230 may comprise several other components or subcomponents 301, 302, 303, and 304. As described above, build script component 230 may be software code, a script, or an application stored on memory 220 and/or executed by processor 210. Accordingly, the various components or subcomponents of build script component 230 may also be executed as software code, scripts, or applications. As shown in FIG. 3, build script component 230 may comprise a build script parsing component 301, a build action component 302, a build action representation component 303, and a security policy component 304.

Each of these subcomponents may be configured to analyze build scripts, code, or associated files received by build script component 230 to enforce security policies in dynamic development pipelines. For example, build script parsing component 301 may access from a database, such as database 140, a build script including a set of instructions for a software build process. Build script parsing component 301 may further parse the build script to identify a set of scripted build instructions. Build action component 302 may analyze the set of scripted build instructions to determine a set of expected build actions. Build action component 302 may access a database, such as database 140, that contains files with tables of relationship data between scripted build instructions and corresponding build actions.

Build action representation component 303 may construct a representation of the expected build actions. Constructing a representation of the expected build actions may include creating a build tree, a graph database, or any other representation that identifies relationships among expected build actions. Security policy component 304 may generate a security policy based on the representation that may include, for example, allowing connections to repositories, granting permissions to connect to third-party packages, granting permission to generate folders and files, granting permission to connect to a container registry, granting permission to execute a set of system call commands, or any other suitable security policy action.

Referring to FIG. 2, security monitoring component 240 may be configured to monitor a build machine running the build script and enforce the security policy on the build machine. Enforcing the policy on the build machine may include performing a security action such as generating an alert, generating a report, blocking an action, allowing an action, prompting a user for administrative approval, revoking permissions, or any other suitable security action.

Aspects of the present disclosure may include involve dynamic development pipelines. A dynamic development pipeline, or CI/CD pipeline, may refer to a continuous integration, continuous delivery, or continuous deployment environment. For example, CI/CD pipelines may compile incremental code changes made by developers, and then link and package them into software deliverables. Automated tests may verify the software functionality, and automated deployment services may deliver them to end users or other participants in the pipeline. More generally, CI/CD pipelines may refer to any development process that involves continuous development, continuous testing, continuous integration, continuous deployment, and continuous monitoring of software applications throughout a development life cycle.

As discussed above, aspects of the present disclosure may include enforcing security policies in dynamic development pipelines. A security policy may include a collection of one or more settings that grants permission to or denies permission to a system component's ability to perform a specified action or a general set of actions. For example, a security policy may include a set of actions that a computing device may be allowed to perform in response to receiving a set of build instructions from a build script. Such policies may include but are not limited to allowing a connection to a repository, granting permission to connect to a third-party resource, granting permission to generate a specified folder and file structure, granting permission to execute a set of system call commands, denying access to an external resource, or any other action that grants or restricts access to data resources.

Figure 4:
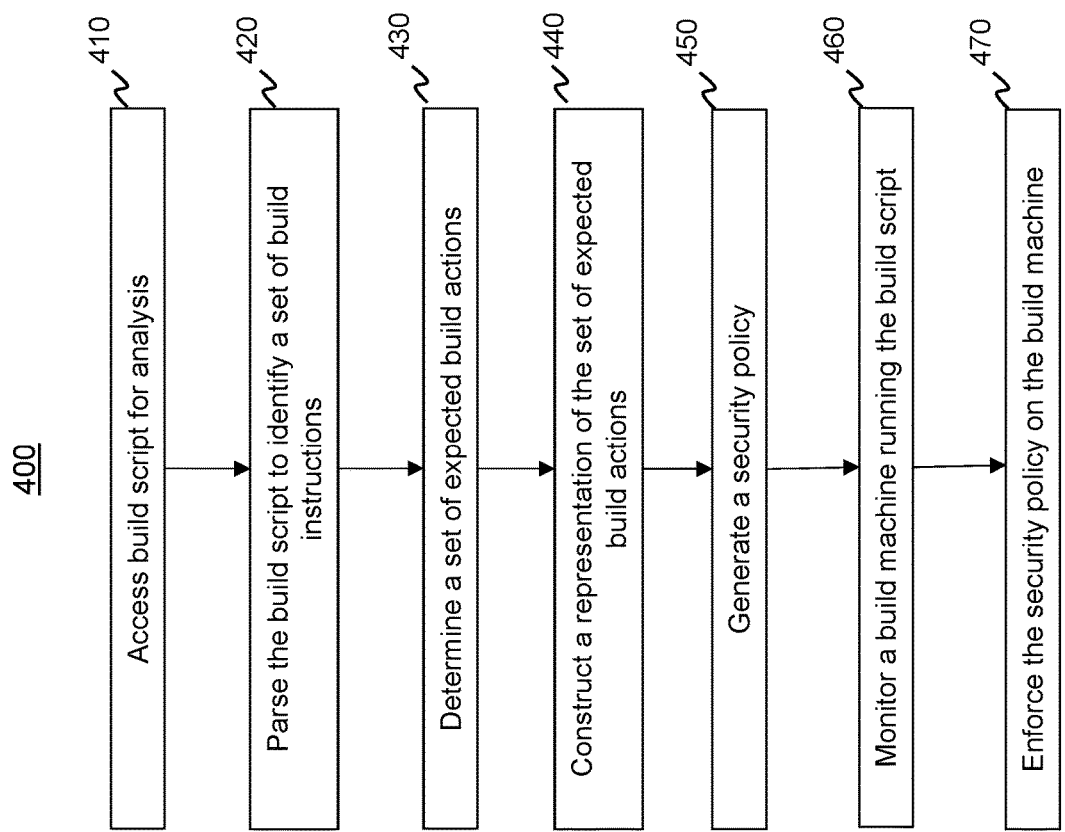
FIG. 4 is a flowchart depicting an exemplary process enforcing security policies in dynamic development pipelines.

FIG. 4 is a block diagram depicting an exemplary process 400 for enforcing security policies in dynamic development pipelines. Process 400 may be performed, for example, by build script component 230, security monitoring component 240, processor 210, or a combination thereof. Step 410 of process 400 may include accessing a build script including a set of instructions for a software build process. Build scripts may refer to a set of instructions used to automate the creation of software builds and the associate processes including compiling computer source code into binary code and packaging binary code. A build script may prepare an output from generated files. A build script may include a code generation tool within the CI/CD process. In some embodiments, build scripts include a set of instructions to draw source code from a repository; establish links to relevant libraries, modules and dependencies; and compile these components into an executable file. For example, a build script written in pseudo-JCL may transform a COBOL source file into an object file, and in some cases the build script transforms one or more object files into a load module. In another example, a build script may be a Jenkinsfile or a text file that contains the definition of a Jenkins pipeline and is checked into source control. More generally, a build script may be any set of instructions that automate the creation and compilation of certain elements of code into a software executable build file.

Accessing a build script may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data. In some embodiments, accessing information may include adding, editing, deleting, re-arranging, or otherwise modifying information directly or indirectly from the network. A user may access the build script using a user device, which may include a computer, laptop, smartphone, tablet, VR headset, smart watch, or any other electronic display device capable of receiving and sending data. In some embodiments, accessing the build script may include retrieving the build script from a web browser cache. Additionally or alternatively, accessing the build script may include connecting with a live data stream of the build script from a remote source. In some embodiments, accessing the build script may include logging into an account having a permission to access the build script. For example, accessing the build script may be achieved by interacting with an indication associated with the build script, such as an icon or file name, which may cause the system to retrieve (e.g., from a storage medium) a build script associated with the indication.

Build scripts may be accessed via a database. A database may comprise any medium for storing and/or executing software as disclosed herein. In other embodiments, build scripts may be accessed within system 100, such as from database 140, and/or server 150 or any other internal repository. In further embodiments, an element of source code may be accessed through a user device, such as an external hard drive, USB memory device, or any other data storage device.

At step 420, the build script may be parsed to identify a set of scripted build instructions. Parsing the build script may include taking input data from the build script and constructing a data structure of the input. For example, parsing the builds script may include analyzing the build script to identify lines of code or instructions that delineate an action or set of actions to be performed by the component accessing the build script. Parsing may be performed using regular expressions, in which a group of regular expressions defines a regular language and a regular expression engine automatically generating a parser for that language, allowing pattern matching and extraction of text. In some embodiments, parsing the build script may include determining that some lines of code or instructions in the script file contain non-executable instructions such as header or descriptor information and such information may be discarded. More generally, parsing the build script may include any analysis of the build script to extract a set of scripted build instructions into a data structure. Parsing the build script may be performed by, for example, build script parsing component 301.

Parsing the build script may identify scripted build instructions. A scripted build instruction may include an action to be performed by a build server. Scripted build instructions may include commands configured to build, test, and deploy code. For example, a scripted build instruction may be a line of code in the build script that identifies a source to obtain other data for use in a build. Sources may include a docker image, a third-party package, an external container image, or any other source of data. Scripted build instructions may include information to build a software package by executing certain code, for example, by running docker containers to introduce data stores, code analytics, or testing applications. Scripted build instructions may include information to deploy compiled code to a source into certain environments. For example, scripted build instructions may include information to deploy compiled code to Amazon Web Services (AWS)™, Firebase™, Google Cloud™, Heroku™, Microsoft Azure™, node package manager (NPM)™, or other environments.

At step 430, a set of expected build actions may be determined based on the scripted build instructions. An expected build action may include an instruction, step, command, or activity, that is performed in the CI/CD pipeline that derives from the scripted build instructions. For example, an expected build action may be a specific command execution contained in the build script. Other expected build actions may not be contained within the scripted build instructions but logically flow from the scripted build instructions. For example, if the set of expected build instructions includes the name of a container image that needs to be pulled and instructions to run the container, the expected build actions may include establishing a connection to the container image source through an IP address or port. In one embodiment, the expected build actions include the scripted build instructions and creating a folder or file structure within a database. Expected build actions may be determined through analysis of historical data and such data may be saved within a data repository. For example, build action component 302 may compare the set of scripted build instructions to historical scripted build instructions stored in a database, such as database 140. The database may contain data associated with the historical scripted build instructions that identifies expected build actions associated with the historical scripted build instructions.

Expected build actions may also be determined in various other ways. For example, expected build actions may be determined through analysis of the context of the scripted build instructions, through analysis of dependencies of elements in the scripted build instructions, through analysis of input and output instructions, or other analytical techniques. Such analyses may be performed by constructing a representation of the set of expected build actions.

In some embodiments, a set of expected build sub-actions may be identified. Build sub-actions may be groups or collections of one or more build actions that belong to a common phase of a build process or may represent a collection of build actions that collectively make up a common control flow. For example, if the scripted build instructions include a command to download and install a third-party package, the expected build actions may include determining the connection requirements to access the external source, identifying a set of folders or files expected to be created at runtime, and downloading files. The build actions in this example may be further grouped into expected build sub-actions.

As step 440, a representation of the expected build actions may be constructed, for example, by build action representation component 303. A representation of the set of expected build actions may include constructing a structured database to represent and store data associated with the expected build actions. For example, constructing a representation of the expected build actions may include creating a graph database and arranging the expected build actions within the graph database. The representation of the expected build actions may further include a representation of expected build sub-actions. Other examples of a representation of the set of expected build actions may constructing a call tree or control flow diagram that arranges hierarchies, predecessors, or successors or expected build actions. Constructing a representation of the expected build actions may include identifying specific command executions contained in the set of scripted build instructions, identifying specific network resources to perform the scripted build instructions, identifying dependencies based on the set of scripted build instructions, identifying input and output instructions based on the set of scripted build instructions, In one example, the scripted build instructions may include accessing an external file. Based on an analysis of historical scripted build instructions, the system may determine that the set of expected build actions includes connecting to a repository containing the external file. In another example, the scripted build instructions may include a command to download and install a third-party package. Based on an analysis of historical scripted build instructions with a similar source and an analysis of the representation of the expected build actions, the system may determine the connection requirements to access external source and may identify a set of folders or files expected to be created at runtime based on the analysis of historical scripted build instructions. In yet another example, the set of scripted build instructions may include building, tagging, and pushing an image to a container registry. Based on an analysis of historical scripted build instructions and an analysis of the representation of the expected build actions, the system may determine the set of expected build actions includes connecting to the container registry and generating a set of system call commands.

At step 450, a security policy may be generated, for example, by security policy component 304. A security policy may be any set of restrictions or permissions associated with a system component accessing the build script. For example, computing device 130 may access the build script through network 110, and a security policy may grant access to or restrict access to certain resources available through the network 110 to computing device 130 or between other components on the network. In some embodiments, a security policy may be a tiered security policy in that the security policy is constructed to grant permissions for certain levels of build actions or sub actions. A tiered security policy may specify permission levels for various expected build actions and may further be based on the representation of the set of expected build actions. For example, the representation of the set of expected build actions may indicate a sequence of expected build actions, for instance, a sequence may be based on dependencies between expected build actions. A tiered security policy may be generated that grants permissions or sets restrictions based on the position of the expected build action in the sequence. Examples of tiered security policies may include allowing a connection to a repository containing an external file, granting permission to connect to a resource from which third-party packages will be downloaded, granting permission to generate folders or files associated with the third-party packages, granting permission to connect to a container registry, or granting permission to execute a specific set of system call commands.

A tiered security policy may be based on the expected set of build actions or sub-actions. In one example, a tiered security policy may be generated that grants permission for every expected build action or sub-action derived from the build script. In an alternative example, the tiered security policy may grant permissions for some of the expected build sub-actions based on the level of the sub-action within the build process. For example, a tiered security policy may grant permissions to allow access to a third-party repository and the generation of a folder or file structure but may require user or administrator authorization to execute other steps in the build process such as connecting to the container registry or executing certain system call commands. A tiered-security policy may be customized to the needs of the user and may be based on profile settings of the user.

A tiered security policy may be implemented based on a set of expected sub actions. In an illustrative embodiment, an example of a build action may be the command "pip install <<PACKAGE NAME>> "that may be invoked to install a third party package. In such a case, a first sub-action may be "go to 'server X' and download a specific package." "Server X" may be, for example, a package manager or a package index such as "PyPi™." A second sub-action may be to install the package on the machine that executed the pip install command. A third sub-action may be to verify the package installation. A tiered security policy may be generated to correspond to the identified sub-actions. Continuing with the example, a tiered security policy may include a first tier to grant the appropriate permissions to execute a command, such as the "EXECVE" system call. A second tier may be to grant the appropriate permission to access "server X" via the network. A third tier of the policy may be to grant access to install the package, including permissions to grant write access to specific folders or files. A fourth tier may be to grant read permission to specific folders to verify the package installation. In this way, a tiered security policy corresponds to the expected build sub-actions.

Generating a tiered-security policy based on the representation of the expected build actions presents unique and novel solutions to problems in the field of cyber-security. For example, malicious actors may compromise a build server and configure it to insert malware into compiled packages that are distributed within the CI/CD pipeline. By generating a tiered-security policy based on the representation of the set of expected build actions, such malicious attempts may be thwarted because the tiered security policy may restrict the build machine from performing any actions other than an expected build action. By tailoring the tiered security policy so that only the expected build actions or sub-actions are performed, any unexpected build actions introduced by malicious actors are not performed by the build machine, which improves security and limits the spread of malware through the CI/CD supply chain. A comprehensive set of expected build actions may be determined through the techniques disclosed herein.

At step 460, process 400 may include monitoring a build machine running the build script. Monitoring may be performed, for example, by security monitoring component 240. Monitoring may include supervising the build machine to detect, analyze, and record its activities. For example, monitoring may include determining the operational status of hardware or software within or operating on the build machine, monitoring a network or system components for malicious activity or violations of the security policy or other security policies, regulating access to certain users to the build machine, performing data logging of operational data associated with the build machine, or any other active security detection system.

At step 470, process 400 may include enforcing the security policy on the build machine. Enforcing the security policy on the build machine may include allowing or denying certain activities by the build machine or another system component in accordance with the settings of the security policy. For example, the security policy may include permission settings to perform certain actions based on the expected build actions. Enforcing the security policy may include permitting the build machine to perform the expected build actions, such as connecting to a repository containing an external file, connecting to a resource from which third-party packages will be downloaded, generating folders or file structures associated with certain third-party packages, connecting to a container registry, or executing a specific set of system call commands. enforcing the security policy may also include denying the build machine permission to perform any action that is not included in the security policy or the expected build actions.

In an embodiment, operations for enforcing security policies in dynamic development pipelines may be used to detect emerging security threats and to update the security policy in response to emerging security threats. An emerging security threat may be a previously unknown or undetected security attack and may include large scale security attacks throughout a CI/CD pipeline. For example, security policies may be generated for multiple build machines that access the same or different build scripts. A security policy may be generated for each of the build machines as disclosed herein. The system may then monitor multiple build machines and detect common failures in the execution of the build scripts. Such common failures may indicate a malicious actor is attempting to compromise security in the system. Once detected, the security policy may be updated to further restrict secure the system.

In some embodiments, enforcing the security policy on the build machine may include performing a security action, performed for example, by security monitoring component 240. A security action may be any function that logs, alerts, reports, blocks, allows, an action associated with the security policy.

In some embodiments, performing the security action may include generating an alert. The alert may be any visual, audio, or haptic feedback that notifies a user of the hidden secret. For example, the alert may be displayed via text or graphics on a computer or other user device. Other examples include alarms, audio pings, or other audio feedback indicating the probability.

In other embodiments, performing the security action may include generating a report. The report may be a text-based report or a visual indicator of a hidden secret such as a pop-up display or user prompt. The report may include audio alerts or warnings indicating a failure in a build script. In another embodiment, the security action may include blocking an action or allowing an action. In another embodiment, the security action may include prompting a user for administrative approval to continue a process or may include revoking permissions.

Figure 5:
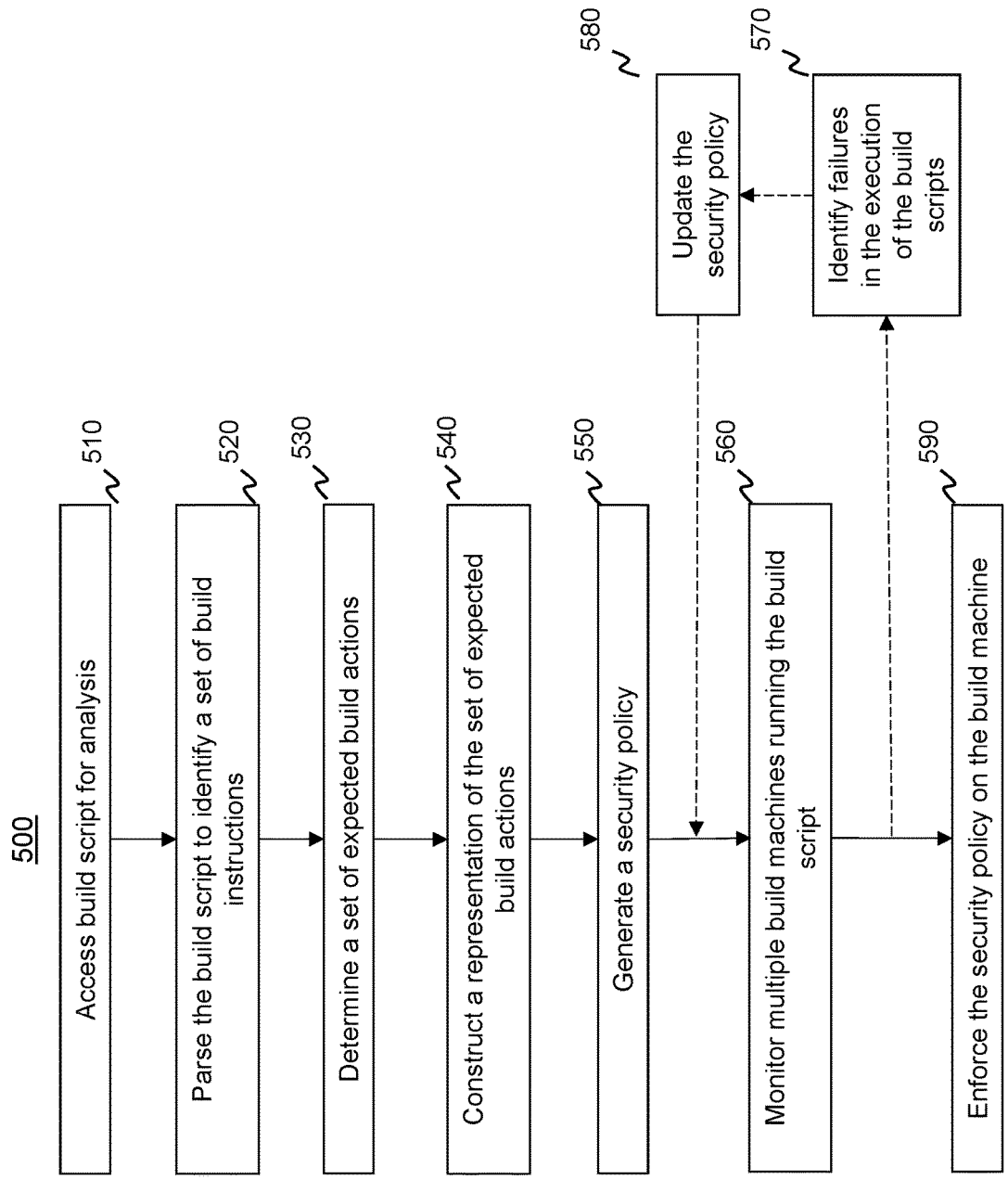
FIG. 5 is a flowchart depicting an exemplary process for enforcing security policies in dynamic development pipelines across multiple build machines that includes an emerging threat detection and monitoring capabilities.

FIG. 5 is a block diagram depicting an exemplary process 500 for enforcing security policies in dynamic development pipelines across multiple build machines that includes emerging threat detection and monitoring capabilities. Process 500 may be performed, for example, by build script component 230, security monitoring component 240, processor 210, or a combination thereof, and may be performed on a plurality of systems containing a plurality of computing devices 130. Process 500 may correspond to process 400 depicted as a block diagram in FIG. 4. Accordingly, the descriptions and methods described above with respect to process 400 may equally apply to process 500.

At step 510, process 500 may include accessing a build script for analysis. At step 520, process 500 may include parsing the build script to identify a set of build instructions. At step 530, process 500 may include determining a set of expected build actions. At step 540, process 500 may include constructing a representation of the set of expected build actions. At step 550, process 500 may include generating a security policy. Steps 510 through 550 of process 500 may correspond with steps 410 through 450 of process 400 as described herein.

At step 560, process 500 may include monitoring multiple build machines running a build script. In an embodiment, the multiple build machines may be running the same build script. In another embodiment, the multiple build machines are running a plurality of build scripts. Each build machine may operate under a security policy with certain permission settings to allow or deny certain activities. In some instances, processes or actions in a build script cannot be executed. Such instances may be considered a failure in the execution of the build script. Failures in the execution of a build script may occur because a malicious actor has tampered with the script file, a system component, or a third-party resource, and the build machine is attempting to perform an action that is not an expected build action and is therefore denied permission to perform the action under the security policy.

At step 570, process 500 may include identifying failures in the execution of the build scripts. A log of failures in the execution of build scripts may be generated and may be stored in a database, such as database 140. The failures may be analyzed to detect malicious actions. For example, a malicious actor may have implanted code in a system resource that is instructing the build machine to access a malicious source. The security policy may prevent access to the source and generates a log of the failure identifying the source. In another example, a malicious actor may compromise a third-party source and may have programmed the source to install files or folders or to execute system call commands that are different than the expected build actions. The security policy may prevent the generation of these resources or system call commands and generates a log of the failure. Failures may be analyzed for common features that indicate a source of attack. For example, the system may determine that many build machines are directed to a common but unexpected third-party source and may flag this source as potentially malicious for further inspection. In an embodiment, the analysis of failures in the execution of the build script may be used to train a machine learning system to further detect failures caused by malicious actors. For example, trained machine learning algorithms may be trained to analyze multiple build machines for common failures which may indicate a security threat.

At step 580, process 500 may include updating the security policy. For example, if an analysis of failures in the execution of a build script detects an emerging security threat, the security policy may be updated to prevent access to the now known threat. For example, if the system detects a permitted third-party source is attempting to create files and folders that are not allowed under the security policy, the security policy may be updated to prevent access to the third-party source.

At step 590, process 500 may include enforcing the security policy on the build machine. Step 590 may correspond to step 470 of process 400 as described herein.

Figure 6:
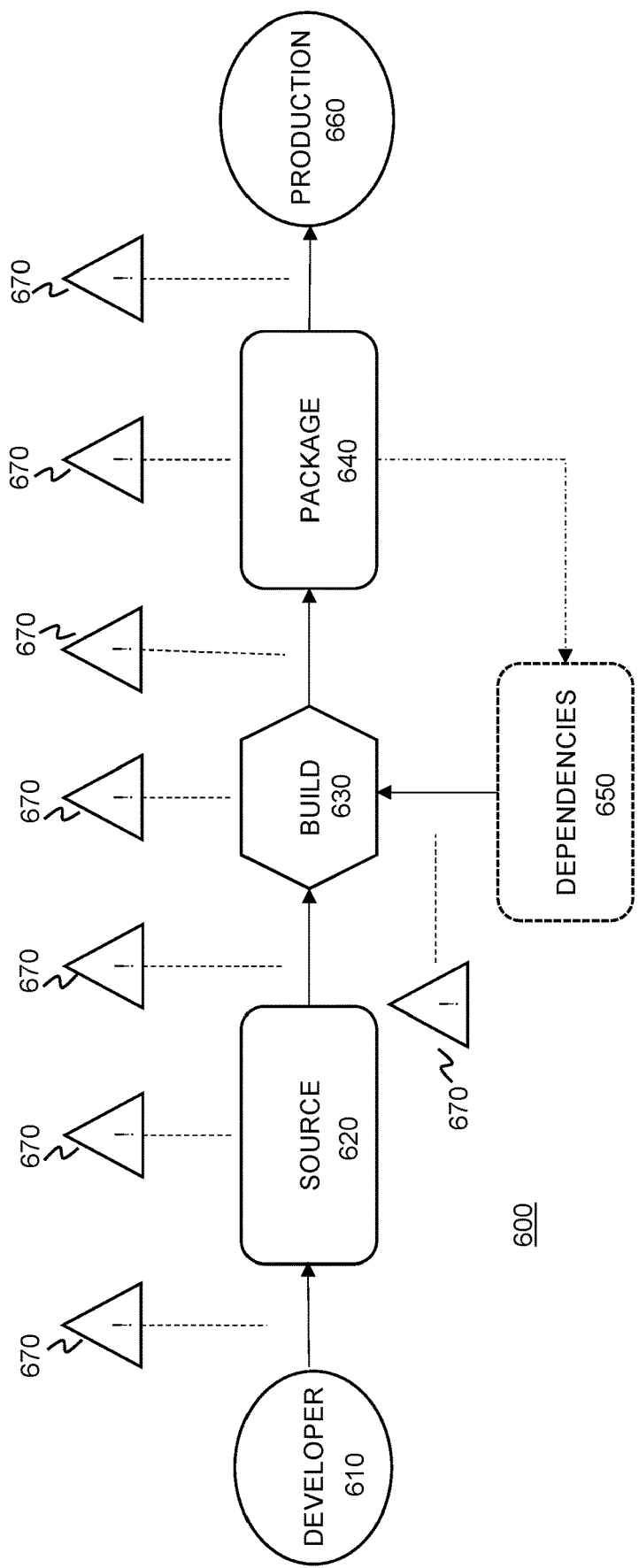
FIG. 6 is a flowchart depicting an exemplary sequence of events and instances of vulnerability to malicious attack when compiling code in a dynamic development pipeline.

In some embodiments, enforcing security policies in a dynamic development pipeline may include monitoring the dynamic development pipeline environment and enforcing the security policies across the dynamic development pipeline environment. For example, FIG. 6 is a flowchart depicting an exemplary sequence of events 600 when publishing an executable in a dynamic development pipeline and it indicates instances of vulnerability of the pipeline to malicious attack or other security threats. In an exemplary workflow, a developer 610 seeks to create a software executable for a production environment 660. Production environment 660 may be an on-premises computing environment operating on the end user's site, a cloud-computing environment accessible by the end user, or a hybrid computing environment combining both on-premises and cloud computing environments. The deployment may go through several phases, such as a sourcing phase 620, a build phase 630, and a packaging phase 640. In a sourcing phase 620, source code may be developed by a developer and stored in a repository or a source code manager. For example, this may be part of a DevOps process, such as continuous development or continuous deployment. During the build phase 630, a build machine may establish links to relevant libraries, modules, and dependencies, represented as dependencies 650. Source code may then be linked to dependencies and packaged in the packaging phase 640 before it is distributed to the production environment 660. The dynamic development pipeline may be vulnerable to attack by malicious actors at several points in time along this development cycle, as illustrated by attack points 670. Thus, enhanced monitoring and security enforcement efforts are needed to enforce security policies along the entire dynamic development pipeline.

Figure 7:
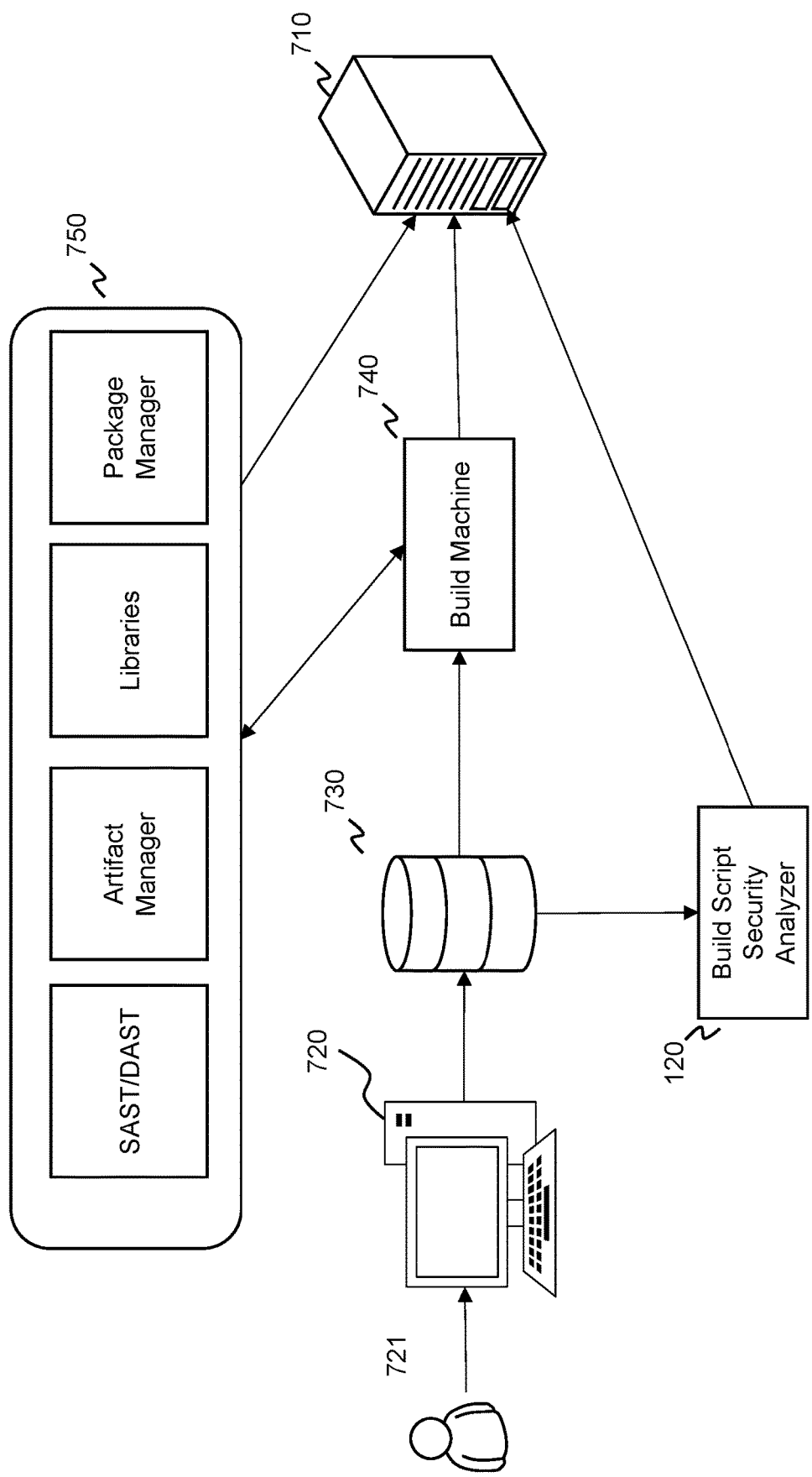
FIG. 7 is another block diagram of an exemplary system for enforcing security policies in dynamic development pipelines in accordance with disclosed embodiments.

FIG. 7 represents a block diagram of an exemplary system 700 for enforcing security policies in dynamic development pipelines throughout the sequence 600 of FIG. 6. System 700 may represent an environment in which software code is developed and/or executed, for example in a cloud environment as discussed above. System 700 may include one or more pipeline security enforcers 710, one or more computing devices 720 operated by a user 721, one or more source code managers 730, one or more build machines 740, third party sources 750, and a build script security analyzer 120 as shown in FIG. 7 and correspondingly in FIG. 1.

The various components may communicate over a network of the type described herein. Computing devices 720 may be a variety of different types of computing devices capable of developing, storing, analyzing, and/or executing software code. For example, computing device 720 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 720 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 720 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. Computing devices 130 may be used for developing and/or running software code, functions, or scripts. For example, a user 721 may develop software code on computing device 720.

A pipeline security enforcer 710 may be any device, component, program, script, or the like, for enforcing security policies in dynamic development pipelines within system 700, as described in more detail below. Pipeline security enforcer 710 may be configured to monitor other components within system 700, including computing device 720, source code manager 730, build machines 740, third party sources 750, and build script security analyzer 120. Like build script security analyzer 120 described above, pipeline security enforcer 710 may include processors and memory of the types described herein.

Source code manager 730 may be any database suitable as a code repository and version control system of source code, such as the distributed version control system "Git", offered by vendors such as GitHub™, GitLab™, Bitbucket™ etc., or centralized version control systems such as Team Foundation Server Version Control (TFVC), offered by Microsoft. Build machine 740 may be any computing device suitable for running a build script for the creation of software builds. Build machine 740 may receive computer source code as an input and may provide an artifact as an output. An artifact may be any software asset that is connected to a software project, such as a copy of code, a version of code, an update to code, metadata associated with code, or a code package and the like. An artifact is typically a package that characterizes or describes the function, architecture, and design of the application and may include images, scripts, executables, compressed files and folders, data models, libraries and/or the compiled application binary.

Third party sources 750 may be repositories that store software components as part of a software supply chain or services and tools that validate source code security. For example, third party sources 750 may include internal pipeline security providers that implement tools for Static and Dynamic Application Security Testing (SAST and DAST). Source code may be sent to a module that may perform SAST and DAST testing. Such testing may be performed by a tool installed on the build machine or as a service by a service provider. The performance of such testing may be at various times, for example, following a code commit, code testing, code update, code saving, etc. Third party sources 750 may also include an artifact manager. An artifact manager may house, manage, version, and deploy different types of artifacts for software builds from a central location. Third party sources 750 may also include a package manager. A package manager may be a system or set of tools to automate installing, upgrading, configuring and using software. The package manager may install and configure tools to prepare an environment for the deployment of a software package.

Improved security measures for securing a dynamic development pipeline, as described herein, may include monitoring the dynamic development pipeline environment running a build script. Monitoring the dynamic development pipeline environment may be performed in various ways. For example, monitoring the dynamic development pipeline environment may include the use of additional software components preinstalled on the dynamic development pipeline environment. Preinstalled software components may refer to software agents installed on a component of the dynamic development pipeline before a developer implements the software build process. In one embodiment, a software agent may include a program installed on the build machine. The agent may act like a debugger and may have high (e.g., administrator or root) privileges for the operating system. Agents may monitor each command executed on the build machine, may monitor network traffic directed to and from the build machine, or may monitor each process running on the build machine. In some embodiments, additional software components may be used that employ certain system calls that enable the control of different processes within an operating system. An example of such system call is "ptrace( )" ("process trace") that is typical to Unix and Unix-like operating systems. The ptrace system call may provide means by which one process (the "tracer") may observe and control the execution of another process (the "tracee"). This may include manipulation of the tracee's file descriptors, memory, and registers, and may allow the tracer to step through the tracee's code, observe and intercept system calls and their results, manipulate the tracee's signal handlers and both receive and send signals on its behalf. In some embodiments, additional software components may include an extended Berkeley Packet Filter (eBPF) tracing tool, or the like, installed on a component of the dynamic development pipeline.

In some embodiments, monitoring the dynamic development pipeline may include collecting automated messages, commands, and application programming interface ("API") calls. Automated messages, commands, and API calls may be generated by a third party source 750 and collected by pipeline security enforcer 710. In an embodiment, an automated message may include HTTP messages sent to a predefined URL. Such HTTP messages, such as webhooks, may be received by the pipeline security enforcer 710 in response to specific events. For example, webhooks may be implemented in the source control manager 730 to transmit a notification to the pipeline security enforcer 710 each time source code is pushed to the source code manager 730. In another example, an artifact manager may employ a webhook to transmit information each time an artifact is deployed to the build machine 740. Webhooks may be transmitted in real-time as an event occurs. More generally, monitoring the dynamic development pipeline environment may include tracking network traffic, including traffic between a build machine and a source code manager, a repository, or a third party source. Of course, techniques other than webhooks may be used instead.

In another embodiment, collecting automated messages, commands, and API calls may include collecting Command Line Interface (CLI) commands. A CLI interface may have security credentials for all components of the dynamic development pipeline. In an embodiment, the CLI interface connects to components of the dynamic development pipeline with API codes and offers queries to those components. For example, CLI commands may request and receive information for all security configurations of an artifact that was deployed, or the identify of users or sources of source code pushed to a build machine in a period of time, such as the last hour, the last day, or any discrete period of time specified by the user.

In some embodiments, monitoring the dynamic development pipeline environment may include collecting information associated with one or more build events. For example, a source code control event may notify the pipeline security enforcer 710 when new code is pushed to the source code control. In another example, an artifact manager may notify pipeline security enforcer 710 when a new artifact code is updated or the build machine 740 may notify the pipeline security enforcer 710 when a new build was executed. Information may be collected by additional software components such as a dedicated system call, a ptrace tracing tool, an extended Berkeley Packet Filter (eBPF) tracing tool, through Command Line Interface (CLI) commands, or with HTTP messages and webhooks. During a build event, typical events standard in a build process may be recorded and logged. For example, benign events like "pip install executed" (executing a Python package installer) or "CDK deploy performed" may be monitored, together with the parameters of the commands. Potential security events may also be detected through monitoring, including messages that "a source code file was changed during build," an "unknown URL was accessed," or "a file was written outside the build execution folder." Such security events may indicate violations of the security policy and may trigger an enforcement action.

Such monitoring methods improve existing security monitoring techniques known in the art. Pipeline security enforcer 710 may implement the computer implemented methods 400 and 500 described herein supplemented with monitoring and enforcement efforts across the entire dynamic development pipeline to enforce security measures across the entire dynamic development pipeline. For example, determining a representation of the set of expected build actions may indicate that one step of the build process is to contact a certain library. In addition to monitoring the build machine to verify that the build machine contacted the specified library, pipeline security enforcer 710 may implement a webhook or the like to receive an update from the library to verify the library pushed the correct package to the build machine. If the information from the webhook and the monitoring of the build machine events do not match, then pipeline security enforcer 710 may implement a security measure to enforce the security policy.

Pipeline security enforcer 710 may implement the computer implemented methods 400 and 500 described herein to enforce security measures across an entire dynamic development pipeline. Upon detection of a violation of the security policy, security enforcer 710 may trigger an enforcement action. For example, in an embodiment, security enforcer 710 may terminate a build process running on a build machine. In another embodiment, security enforcer 710 may block deployment of source code from a repository to a build machine. In yet another embodiment, security enforcer 710 may block deployment of an artifact to the production environment. As aforementioned, a production environment may be where the code is executed and access to resources such as databases, file systems, etc. is performed. Denying deployment of a package or artifact improves existing security techniques over simply terminating the build process. In the instance where a security vulnerability is detected in a library or artifact, the build process may otherwise continue with only the specific compromised resource or artifact being blocked from the deployment. In general, enforcing the security policy may include interfering with at least one event within the dynamic development pipeline environment, and may occur at any component in the pipeline described in FIG. 7, or along any point in time of the development process as described in FIG. 6. Consistent with above embodiments, enforcing the security policy may also include other actions (e.g., triggering the monitoring of activity in the environment, triggering initiation of other security applications or processes, generating reports of activity in the environment, etc.).

Figure 8:
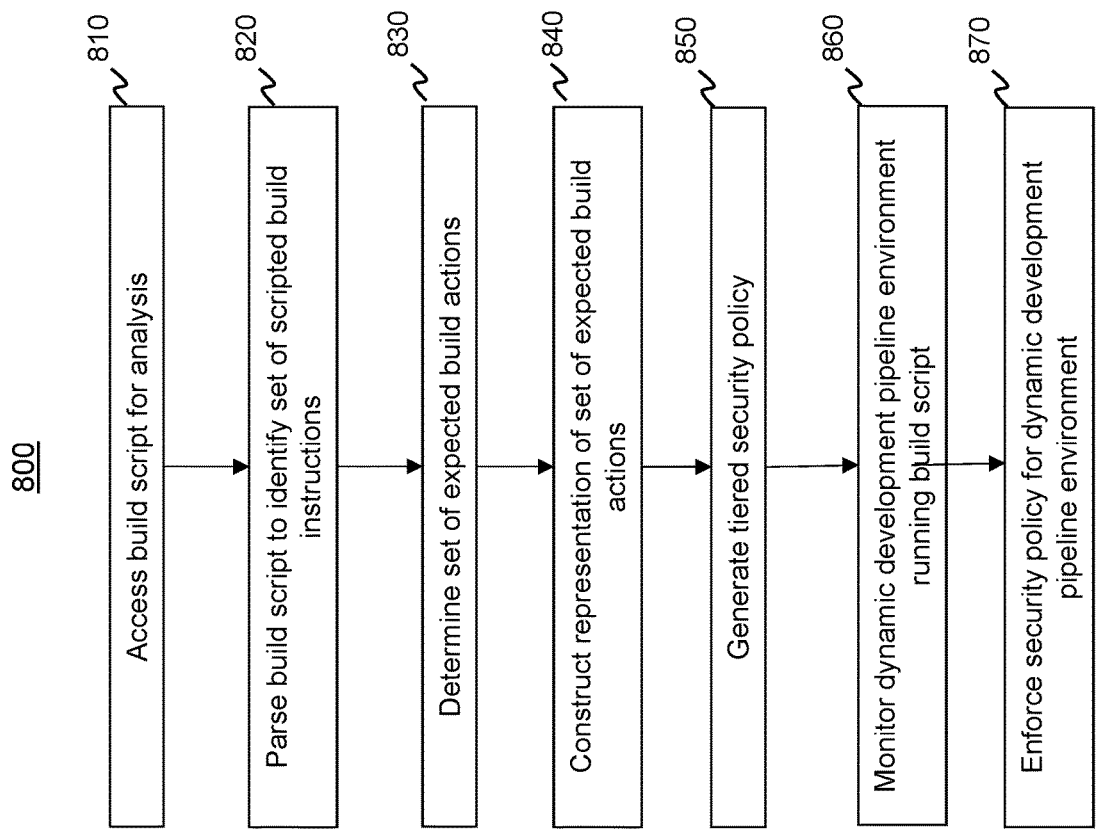
FIG. 8 is a flowchart depicting an exemplary process for enforcing security policies in dynamic development pipelines.

FIG. 8 is a block diagram depicting an exemplary process 800 for enforcing security policies in dynamic development pipelines. Process 800 may be similar to process 400 described above. For example, process 800 may be performed by build script component 230, security monitoring component 240, processor 210, or a combination thereof. Similarly, process 800 may be performed by build machine 740 or other components of system 700 as shown in FIG. 7.

Step 810 may include accessing a build script including a set of instructions for a software build process. Accordingly, step 810 may substantially resemble step 410 of process 400, as described above.

Step 820 may include parsing the build script to identify a set of scripted build instructions. Accordingly, step 820 may substantially resemble step 420 of process 400, as described above.

Step 830 may include determining a set of expected build actions based on the set of scripted build instructions. Accordingly, step 830 may substantially resemble step 430 of process 400, as described above.

Step 840 may include constructing a representation of the set of expected build actions. Accordingly, step 840 may substantially resemble step 440 of process 400, as described above.

Step 850 may include automatically generating a tiered security policy based on the representation of the set of expected build actions. Accordingly, step 850 may substantially resemble step 450 of process 400, as described above.

Step 860 may include monitoring a dynamic development pipeline environment running the build script. Accordingly, step 860 may share similarities with step 460 of process 400, as described above. Further, the monitoring of step 860 may occur as discussed above in connection with the entire pipeline environment of FIG. 6. For example, the monitoring may occur at any one or more of developer 610, source 620, build 630, package 640, or the production environment 660. As discussed in connection with FIG. 7, this monitoring may effectively detect threats and vulnerabilities throughout the pipeline environment.

Step 870 may include enforcing the security policy for the dynamic development pipeline environment. Accordingly, step 870 may share similarities with step 470 of process 400, as described above. As discussed in connection with FIGS. 6 and 7, moreover, the enforcing of step 870 may occur at one or more points in the pipeline environment. For example, the enforcing may be implemented at any one or more of developer 610, source 620, build 630, package 640, or production environment 660. As discussed above, this allows for technological improvements in the security of the environment because threats and vulnerabilities may be detected and remediated as various points in the pipeline. Rather than wait for potentially malicious or vulnerable code to be deployed or shared outside of a pipeline, the threats may be identified and efficiently remedied within the pipeline. These techniques thus enhance both system security and the efficiency of security protocols.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for enforcing security policies in dynamic development pipelines, the operations comprising:
   accessing a build script including a set of instructions for a software build process;
   parsing the build script to identify a set of scripted build instructions;
   determining a set of expected build actions based on the set of scripted build instructions;
   constructing a representation of the set of expected build actions;
   automatically generating a tiered security policy based on the representation of the set of expected build actions;
   monitoring a dynamic development pipeline environment running the build script; and
   enforcing the security policy for the dynamic development pipeline environment.

2. The non-transitory computer readable medium of claim 1, wherein monitoring the dynamic development pipeline environment further includes the use of additional software components preinstalled on the dynamic development pipeline environment.

3. The non-transitory computer readable medium of claim 1, wherein monitoring the dynamic development pipeline environment further includes collecting automated messages, commands, and API calls.

4. The non-transitory computer readable medium of claim 3, wherein the automated messages include HTTP messages sent to a predefined URL.

5. The non-transitory computer readable medium of claim 3, wherein collecting automated messages, commands and API calls includes collecting Command Line Interface (CLI) commands.

6. The non-transitory computer readable medium of claim 2, wherein monitoring the dynamic development pipeline environment includes collecting information associated with one or more build events.

7. The non-transitory computer readable medium of claim 2, wherein at least one of the additional software components is a ptrace tracing tool.

8. The non-transitory computer readable medium of claim 2, wherein at least one of the additional software components is an extended Berkeley Packet Filter (eBPF) tracing tool.

9. The non-transitory computer readable medium of claim 1, wherein monitoring the dynamic development pipeline environment includes tracking network traffic between a build machine and a source code manager or a repository.

10. The non-transitory computer readable medium of claim 1, wherein enforcing the security policy includes terminating a build process running on a build machine.

11. The non-transitory computer readable medium of claim 1, wherein enforcing the security policy includes blocking deployment of source code from a repository to a build machine.

12. The non-transitory computer readable medium of claim 1, wherein enforcing the security policy includes blocking deployment of an artifact to a production environment.

13. The non-transitory computer readable medium of claim 1, wherein enforcing the security policy includes interfering with at least one event within the dynamic development pipeline environment.

14. The non-transitory computer readable medium of claim 1, wherein the operations further comprise:
   determining a set of expected sub-actions based on the build actions; and wherein:
      the representation includes the set of expected build actions and sub-actions; and
      the tiered security policy is based on the representation of the set of expected build actions and sub-actions.

15. The non-transitory computer readable medium of claim 1, wherein constructing the representation of the set of expected build actions includes identifying specific command executions contained in the set of scripted build instructions.

16. The non-transitory computer readable medium of claim 1, wherein:
   the set of scripted build instructions include accessing an external file; and
   the set of expected build actions include connecting to a repository containing the external file.

17. The non-transitory computer readable medium of claim 1, wherein:
   the set of scripted build instructions includes building, tagging, and pushing an image to a container registry;
   the set of expected build actions includes connecting to the container registry; and
   the operations further comprise generating a set of system call commands.

18. The non-transitory computer readable medium of claim 1, wherein the tiered security policy is based on dependencies between expected build actions.

19. A computer-implemented method for enforcing security policies in dynamic development pipelines, comprising:
   accessing a build script including a set of instructions for a software build process;
   parsing the build script to identify a set of scripted build instructions;
   determining a set of expected build actions based on the set of scripted build instructions;
   constructing a representation of the set of expected build actions;
   automatically generating a tiered security policy based on the representation of the set of expected build actions;
   monitoring a dynamic development pipeline environment running the build script; and
   enforcing the security policy for the dynamic development pipeline environment.

20. The computer implemented method of claim 19, wherein monitoring the dynamic development pipeline environment includes collecting information associated with one or more build events using software components preinstalled on the dynamic development pipeline environment; and
   wherein monitoring the dynamic development pipeline environment further includes receiving automated HTTP messages sent to a predefined URL.

* * * * *